US008270793B2

(12) United States Patent
Figenschou et al.

(10) Patent No.: US 8,270,793 B2
(45) Date of Patent: Sep. 18, 2012

(54) POWER UMBILICAL

(75) Inventors: Arild Figenschou, Billingstad (NO); Finn Peter Gjerull, Høvik (NO)

(73) Assignee: Aker Subsea AS, Lysaker (NO)

( * ) Notice: Subject to any disclaimer, the term of this patent is extended or adjusted under 35 U.S.C. 154(b) by 357 days.

(21) Appl. No.: 12/520,297

(22) PCT Filed: Dec. 14, 2007

(86) PCT No.: PCT/NO2007/000444
§ 371 (c)(1), (2), (4) Date: Jun. 19, 2009

(87) PCT Pub. No.: WO2008/075964
PCT Pub. Date: Jun. 26, 2008

(65) Prior Publication Data

US 2010/0054677 A1 Mar. 4, 2010

(30) Foreign Application Priority Data

Dec. 20, 2006 (NO) .................................... 20065943

(51) Int. Cl.
*G02B 6/44* (2006.01)
*H01B 11/02* (2006.01)
*H01R 43/00* (2006.01)
*F16L 1/12* (2006.01)

(52) U.S. Cl. ....... 385/101; 385/104; 174/70 R; 174/116; 174/47; 29/868; 405/169

(58) Field of Classification Search .................. 385/100, 385/101, 102, 106, 107, 113, 104, 111; 174/68.1, 174/70 R, 76, 47; 29/868; 405/169
See application file for complete search history.

(56) References Cited

U.S. PATENT DOCUMENTS 2,800,524 A * 7/1957 Van Lear ...................... 174/116
3,526,086 A 9/1970 Morgan
3,993,860 A * 11/1976 Snow et al. ..................... 174/69
4,256,146 A 3/1981 Genini et al.

(Continued)

FOREIGN PATENT DOCUMENTS

GB 953833 A 4/1964

(Continued)

*Primary Examiner* — Brian Healy
(74) *Attorney, Agent, or Firm* — Birch, Stewart, Kolasch & Birch, LLP

(57) ABSTRACT

A power umbilical is shown that comprises a number of power cables (4) to transfer large amounts of electric power, optionally electric wires and/or optical conductors (5), filler material (2, 3) in the form of rigid elongated plastic elements that are located at least partially around and between the power cables (4) and the optional wires/conductors (5), and they are collectively gathered in a twisted bundle by means of a laying operation. A protective jacket (1) encompasses the power cables (4), the optional wires/conductors (5), the filler material (2, 3), and at least one load carrying element (6) predetermined located in the cross section of the power umbilical. The power cables (4), the optional wires/conductors (5), the filler material (2, 3) and the at least one load carrying element (6), are alternately laid, i.e. by continuously alternating direction, in the entire or part of the longitudinal extension of the power umbilical. This is combined with that the laid bundle is retained or maintained substantially rotationally rigid by the protective jacket (1), possibly by the addition of a strength band, or tape, which is helically wound around the bundle adjacent to the protective jacket (1).

22 Claims, 4 Drawing Sheets

U.S. PATENT DOCUMENTS

Figure 1:
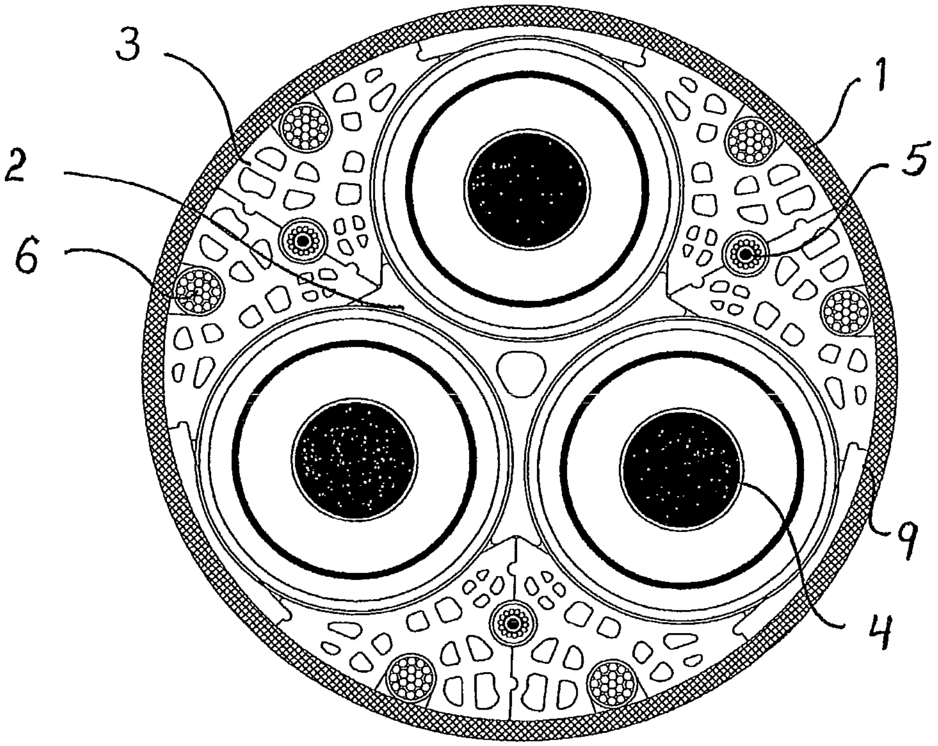

| | | | | |
|---|---|---|---|---|
| 4,336,415 | A | 6/1982 | Walling | |
| 4,707,569 | A * | 11/1987 | Yoshimura et al. | 174/116 |
| 4,780,574 | A * | 10/1988 | Neuroth | 174/102 D |
| 5,261,462 | A | 11/1993 | Wolfe et al. | |
| 5,268,971 | A * | 12/1993 | Nilsson et al. | 385/101 |
| 5,495,547 | A * | 2/1996 | Rafie et al. | 385/101 |
| 5,813,106 | A | 9/1998 | Haug et al. | |
| 5,902,958 | A | 5/1999 | Haxton | |
| 6,046,404 | A | 4/2000 | Figenschou et al. | |
| 6,102,077 | A | 8/2000 | Legallais et al. | 138/115 |
| 6,146,052 | A | 11/2000 | Jacobsen et al. | |
| 6,283,206 | B1 | 9/2001 | Fraser et al. | |
| 6,472,614 | B1 | 10/2002 | Dupont et al. | 174/705 |
| 6,538,198 | B1 | 3/2003 | Wooters | |
| 6,940,054 | B1 | 9/2005 | Heggdal | |
| 7,473,844 | B2 | 1/2009 | Figenschou et al. | |
| 7,485,811 | B2 | 2/2009 | Mjelstad | |
| 2003/0116212 | A1 | 6/2003 | Thomson | |
| 2006/0144456 | A1 | 7/2006 | Donnison et al. | |
| 2006/0193572 | A1 | 8/2006 | Mjelstad | |
| 2007/0205009 | A1 | 9/2007 | Figenschou | |
| 2007/0253778 | A1 | 11/2007 | Figenschou | |
| 2010/0054677 | A1 * | 3/2010 | Figenschou et al. | 385/101 |

FOREIGN PATENT DOCUMENTS

| | | | |
|---|---|---|---|
| GB | 2 219 063 | A | 11/1989 |
| GB | 2 395 539 | A | 5/2004 |
| NO | 311988 | B1 | 2/2002 |
| WO | WO 2004/111515 | | 12/2004 |

* cited by examiner (Figure D-2—Oscillatory Lay-up)

APPENDIX E—UMBILICAL CONSTRUCTION (Figure E-1—Typical Umbilical with Inner and Outer Thermoplastic Sheath)

(Figure E-2—Typical Umbilical with Inner and Outer Roving Sheath)

POWER UMBILICAL

The present invention relates to a power cable, or power umbilical, comprising a number of electric cables for transfer of vast amounts of electric power/energy, possibly electric wires and/or optical conductors, filler material in the form of stiff elongate plastic elements located at least partially around and between the electric cables and the possible wires/conductors, which are collectively gathered in a twisted bundle by means of a laying operation, a protective sheath that encompasses the electric cables, the wires/conductors and the filler material, and at least one load carrying element predetermined located in the cross section of the power cable/umbilical.

The invention also relates to a method of manufacturing a power cable, or a power umbilical, of the introductory said kind.

It is to be noted that the invention finds use in both the relatively newly suggested power cable, or power umbilical, i.e. a power cable, or power umbilical that is able to transfer large amounts of electric power, and the more traditional umbilical. The present application relates to the newly proposed power cable, or power umbilical, while the more traditional umbilical is subject to a separate patent application filed on the same day as the present application.

Already now it is to be emphasized that we make a distinction between power cable and power umbilical, while both are regarded to be within the scope of the invention. A power umbilical is here defined to include the heavy electric cables, the electric wires and/or optical conductors, filler material, at least one load carrying element, strength band or tape and the outer sheath. One can also contemplate the inclusion of smaller fluid pipes of steel. A power cable alone is omit fluid pipes, electric wires and/or optical conductors, but have the remaining elements mentioned above.

The traditional way to manufacture an umbilical is shown in NO 174 940 (WO 93/17176) and NO 971984. When looking into the figures in the first document, in particular FIG. 1, the machinery normally required to manufacture such umbilical is shown. The shown method and machinery will also be guiding for the new power cable, or power umbilical. As shown, the machinery is complicated, space demanding, voluminous, and accordingly very cost intensive. In addition, due to the size, the machinery necessarily needs to be stationary, i.e. be located in a large facility, preferably close to a harbour.

The machinery necessarily needs to have these dimensions in order to fulfill its functions, namely be able to wind the elongate elements together into a bundle that extends helically in the longitudinal direction thereof having a predetermined laying length, typically 1.5 to 15 meters per revolution, depending on intended application.

It is a distinct desire from the industries to be able to manufacture the new power cable, or power umbilical, by use of considerably simpler machinery. In addition there is a desire to have a mobile facility that can produce at site, or close to the site, such as on board a lay vessel. How to enable this, in consideration of the premises above? Some regards have been necessary to take, such as the ability of the umbilical to take up tensional loads. This is discussed below.

The power cable, or power umbilical, is designed to be able to transfer vast amounts of electric power, for example from the sea surface to production equipment for oil and gas located on the sea bottom. The power cable, or the power umbilical, includes heavy gauge cables for transportation of electric power to electric powered equipment on the sea bed, such as large pump stations that provides displacement of recovered oil and/or gas.

Another usage that is actualized is power cables from wind mills that are placed offshore in the sea. In order to be able to transfer the produced energy from the generators in the wind mills, heavy gauge power cables from the wind mills and to a land based terminal are deployed on the sea bed.

When such a power umbilical that includes a bundle of twisted, elongate elements are subjected to tensional loads, for example during deployment on deeper waters, the twisted, or wound, elements will tend to “straighten out” or “twist open”. It is the load carrying elements in the cross section that are dedicated to take up the tensional loads. The load carrying elements can be steel wires or be made of composite material, either in the form of individual composite rods distributed on the cross section or rods gathered in bundles.

Thus it is to be understood that the present power cable, or power umbilical, primarily is intended to be used for stationary purposes and needs its tension capacity first of all during the deployment thereof, for subsequently to remain more or less stationary on the sea bed without material axial loads.

These heavy gauge electric cables, normally produced of copper wire, are now integrated into the more traditional umbilical. These umbilicals are in turn in steady development and changes construction/design and functions in view of actual needs. These heavy gauge electric cables add substantial weight to the umbilical due to the specific gravity of the copper material. When we know that the copper material has a very poor load carrying capacity, it will be of great importance that the copper wires do not substantially participate in the load carrying function, which in practise involves the load carrying of its own weight.

With the now proposed solution for the laying operation of the power umbilical, which simplifies the manufacturing process substantially, the load carrying elements will not necessarily be able to fulfill their function, namely be able to transfer substantial loads, or tensional loadings. They will only tend to straighten out (unwind). However, such a new solution will require only a very simple machinery of manufacture compared with the traditional one. So all the desires set forth above will be fulfilled. But as one will understand, a new problem is created—how to enable the load carrying function?

This is an acknowledged problem and in this respect we refer to U.S. Pat. No. 6,472,614 in the name Coflexip. In column 1, from the middle of the page and down, it is indeed described that the elements of the umbilical normally (traditionally) are wound together in the well known S-Z configuration, which means that it is wound alternating with shifting direction. Further it is described that since the S-Z configuration cannot withstand substantial tensile stress without unwinding (as described above), additional layers of armouring (steel or Kevlar, for example) must be wound counter helically around this bundle to take up the tensile stress. The armouring consists of a plurality of steel rods placed side by side with small pitch relative to the longitudinal axis of the umbilical.

In order to teach how this umbilical typically looks like, the US patent tells that this is disclosed in API (American Petroleum Institute) specification 17E, “Specification for Subsea Production Control Umbilicals”, in particular pages 42, 43 and 44. Abstracts from this are shown in FIGS. 7-8 and are marked with “prior art”.

Such is also included to illustrate the traditional way of thinking when it comes to S-Z laying (winding) combined with load carrying. This requires armouring rods that are helically wound (not S-Z) in at least two layers and each layer is wound in opposite directions to each other in order that they shall be able to act as the load carrying elements in the cross section.

Another problem with this type of subsea power cables, or power umbilicals, has been that they need to be spliced relatively frequently, perhaps every 500 meters. This results in a substantial number of joints if lengths of several tenths of kilometers are to be supplied. Every single splicing operation is time consuming. In complicated cross sections of the umbilical, it may take a couple of days to perform such a splicing operation.

Thus a challenge has been prevailing in the task to be able to manufacture substantial lengths of power cables, or power umbilicals, having complicated cross sections and with fewer splices than before; in brief achieve a more continuous and effective production. Similarly, as before, it is a demand that the power cable, or power umbilical can be coiled up on carousels or reels for shipping and transportation purposes.

In accordance with the present invention a power cable, or power umbilical, of the introductory said kind is provided, which is distinguished by the fact that the electric cables, the possible wires/conductors, the filler material and the at least one load carrying element, are alternately laid, i.e. by continuously alternating direction, in the entire or part of the longitudinal extension of the power cable/umbilical, combined with that the laid bundle is kept fixed substantially torsion stiff by the protective sheath, possibly with the addition of a strength band, or tape, which is helically wound about the bundle just internal of the protective sheath.

It is to be understood that the strength band, or tape, can be varied according to which depths the power cable, or power umbilical is to be deployed, or, actually, may be omitted completely. At small depths the strength band can be one simple ribbon, strip or tape just to keep the bundle together until the outer sheath is extruded thereon. When the depth become deeper it may be necessary with a steel band that is wound around the bundle. A detailed explanation appears from the text below.

According to the idea of the invention, the present power cable, or power umbilical, is designed in such a way that the wounded elements are prevented from unwinding, in spite they are S-Z wound.

This is achieved in that:

a) the twisted elements are in engagement with the filler profiles which fully or partly encloses the twisted elements b) the umbilical is sufficiently torsional stiff to counteract the torque that the load carrying elements generates under axial tension c) the inner friction counteracts that the elements unwinds.

By this new way to lay power umbilicals, so called S-Z laying, combined with an outer sheath and/or strength band, the above described is achieved. Said in a different way, engagement of filler profiles in combination with the torsion stiffness of the umbilical and internal friction counteracts that the S-Z laid bundle unwinds when the elements are put into tension. The described power cable, or power umbilical, immobilizes the load carrying elements and the remainder elongate elements of the cross section, both with regard to radial motion, axial elongation and torsion, and at the same time the load carrying elements are able to fulfill their duty as load transferring elements in spite of their sinus configuration.

In addition, simpler and less comprehensive production machinery that requires less space and has lower cost, is achieved. It is also considered to be possible to make a mobile facility for direct use in the proximity of actual fields that are developed. It is further to be understood that to wind for example common electric conductors, or wires, by means of S-Z winding is commonly known. But to design and manufacture an S-Z laid power cable, or power umbilical, where components are able to take load, has never been done before as far as we know.

In a suitable embodiment the strength band, or the tape, is helically wound about the bundle in two or more layers, laid in opposite directions. Further the strength band, or the tape, can be helically wound about the bundle by relatively short laying length, like 0.1 to 0.5 meter.

The strength band can be of metallic material, like steel, lead or aluminium. Alternatively the strength band can include fiber armoured ribbon, fiber armoured ribbon with friction liner and textile ribbon, where the fibre armoured ribbon can be reinforced with aramid fiber, carbon fiber, glass fiber and other synthetic materials.

It is to be understood that the laying of the electric cables, the possible wires/conductors, filler material and possibly other load carrying elements can alter direction at irregular intervals, while in another alternative embodiment it may alter direction at regular intervals. In a typical embodiment, as one can recognize today, the laying will take place over approximately one half to three revolutions before it alters direction and is laid a corresponding number of revolutions in opposite laying direction before it once more alters direction.

As mentioned, it is to be understood that with this form for laying one looses, viewed isolated, the ability of the individual components to receive and transfer tensional loads. If they are subjected to tension, they only tend to straighten out (unwind).

Figure 6:
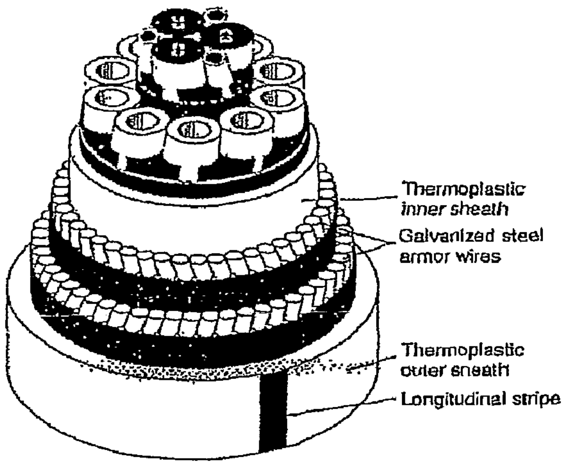
Figure 6:
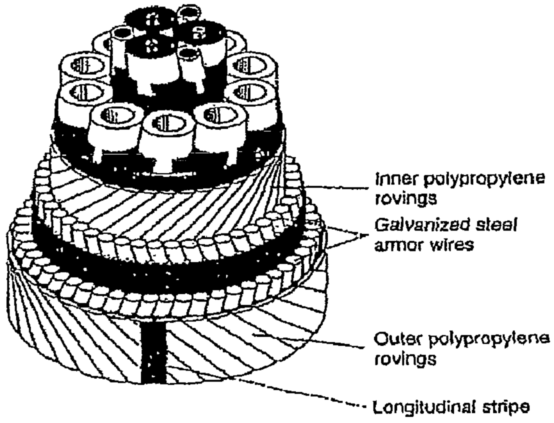

In one embodiment the power umbilical includes one or more separate layers with load carrying elements as outer layer that is located just within the sheath. These load carrying elements in each layer are, however, laid in a traditional way in a continuous helix in the same direction in the entire length extension of the umbilical. This will almost be as shown in FIG. 6.

Preferably the load carrying elements can be light weight rods of composite material and/or steel string or steel wire and/or fiber rope and/or polyester rope.

It is also a possible variant that the power umbilical includes at leas tone fluid pipe in the cross section, of metal and/or plastic material.

According to the present invention also a method of the introductory said kind is provided, which is distinguished in that the electric cables, the possible electric wires and/or optical conductors, the filler material and the load carrying elements are alternating laid, i.e. by constantly shifting direction, in the entire or part of the longitudinal extension of the power cable/umbilical, and that the or each load carrying element either is centrally or peripheral located during the manufacture, and that the laid bundle is retained substantially torsional stiff by applying the outer protective sheath, possibly by the addition of a strength band, or a tape, that is helically wound about the bundle after said laying operation is completed and before the protective sheath is applied.

The strength band, or the tape, can be wound in a helix about the bundle in two or more layers laid in different directions. The strength band, or the tape, can be helical wound about the bundle with relatively short laying length, such as 0.1 to 0.5 meter. The laying can be performed with alternating direction at irregular intervals, alternatively at regular intervals. The laying operation can take place over approximately one half to three revolutions before the direction thereof changes.

In one embodiment one or more separate layers of load carrying elements can be applied as outer layer inside the sheath, said load carrying elements in each layer are laid continuous in a helix in the same direction in the entire longitudinal extension of the power umbilical.

This means that the electric cables, the wires/conductors, the filler material and load carrying element(s) can be supplied differently than with the previous machine, which in turn implies that the production equipment can be differently organized. By continuous laying in one direction with the huge bobbins of the machine, in addition to that they rotate about their own axis, are also brought to continuous, timed rotation about the longitudinal axis of the power umbilical in order to obviate torsional stresses within the elongate elements that are fed out of the bobbins. These potential torsional stresses will by the new laying method only arise in small extent since the laying direction is shifting all the time. Those torsional stresses that build up in one direction are in turn relived when the laying direction changes and diminish towards zero again. Thus the huge bobbins do not need to rotate about the longitudinal axis of the power umbilical, but can remain stationary. This simplifies the machine very significant. So significant that one can easily contemplate to construct a mobile facility where the power umbilical can be produced at the site for deployment, for example on board a vessel moored proximate to an offshore oil or gas field.

Figure 2:
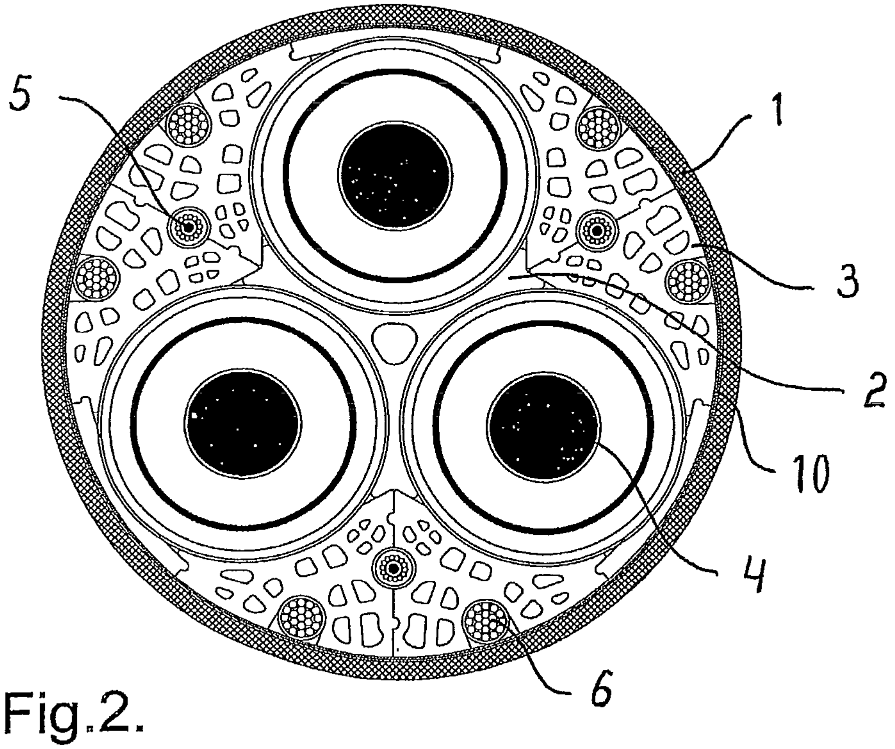
Figure 3:
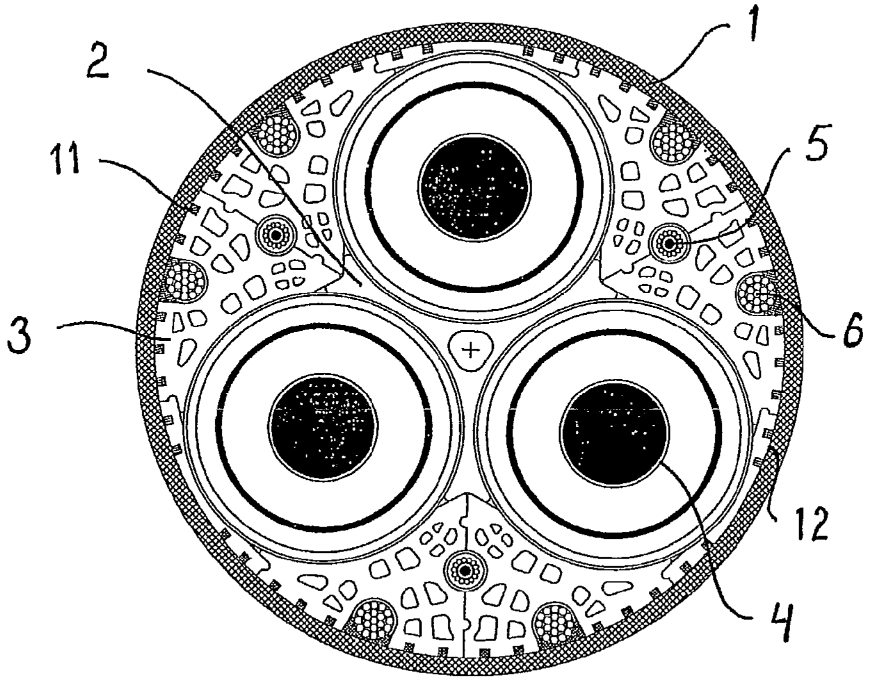
Figure 4:
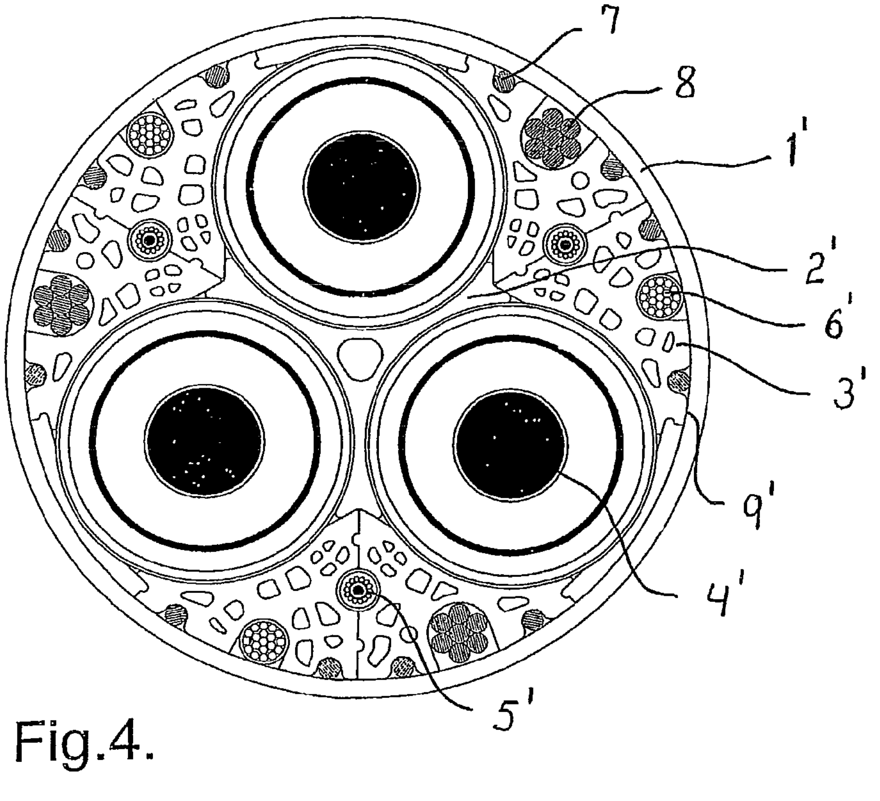
Figure 5:
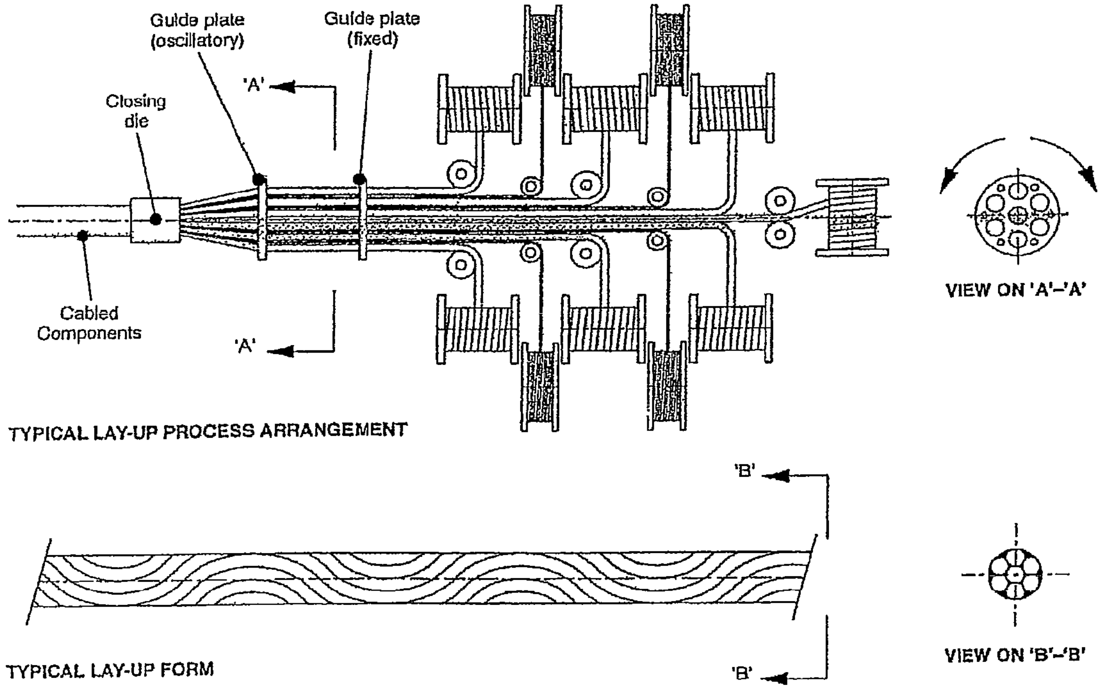

Other and further objects, features and advantages will appear from the following description of preferred embodiments of the invention, which is given for the purpose of description, and given in context with the appended drawings where:

FIG. 1 shows a cross sectional view through a first embodiment of the power umbilical, or power cable, according to the invention, where fiber tape is wound around the bundle of elongate elements, FIG. 2 shows a cross sectional view through a variant of first embodiment of the power umbilical shown in FIG. 1, where steel band is wound around the bundle of elongate elements, FIG. 3 shows a cross sectional view through another variant of first embodiment of the power umbilical shown in FIG. 1, where longitudinally extending grooves in the filler material are filled with sheath material, FIG. 4 shows a cross sectional view through a second embodiment of the power umbilical according to the invention, where carbon rods is included in the cross section, FIG. 5 (prior art) shows extracts from API (American Petroleum Institute) specification 17E, figure D-2 that shows schematically a S-Z laid cable and laying machine, FIG. 6 (prior art) also shows extracts from API (American Petroleum Institute) specification 17E, figures E-1 and E-2 that show typical umbilicals having thermoplastic pipes laid in this way.

Two embodiments of the cross sections of the power cable/umbilical shown in the FIGS. 1-4 will now be described, the first in three variants and the second in only one. It is to be understood, however, that many embodiments and variants are within the scope of the appended claims. For the detailed construction of the traditional umbilical and how it is manufactured, reference is given to the previously mentioned WO 93/17176.

The power cable, or power umbilical, according to FIG. 1 is basically constructed of the following elements: a bundle of elongate elements consisting of inner and outer channel elements 2, 3, for example of polyvinyl chloride (PVC), electric cables 4 to transfer vast amounts of electric power/energy, optical conductors 5 and load carrying elements in the form of steel wires 6, that are laid together into said bundle. The bundle is kept together and in place by a strength band. In this variant according to FIG. 1, fiber ribbon 9 that is wound circumferentially around the bundle before an outer sheath 1, for example made of polyethylene (PE), is extruded onto the bundle. As mentioned the cross section can also include fluid pipes (not shown) in some embodiments or variants.

As an illustrating example of the dimensions we talk about here, without thereby being considered as limiting, the electric power transferring part of the cable 4 can be twisted copper threads that together make a power conducting square section of 35 $mm^2$. The diameter of the power umbilical can, as an example, be 226 mm. It is further to be understood that, in addition, regular electric wires (not shown) can be included for control purposes in all of the embodiments and variants, all after actual needs.

The inner and outer channel elements 2, 3 are laying at least partly around and between the electric cables 4 and are typically made as rigid, elongate, continuous elements of plastic material. The electric cables 4, the possible wires/conductors 5, the filler material 2, 3 and the at least one load carrying element 6, are alternating laid, i.e. having steadily changing direction, in the entire or part of the longitudinal extension of the umbilical. In addition, the laid bundle is kept substantially torsional stiff by the protective sheath 1 by the addition of a strength band in the form of a fiber ribbon 9 that is helically wound around the bundle immediate inside the protective sheath 1.

The power cable, or the power umbilical, according to FIG. 2 is a variant of that shown in FIG. 1 and most of the elements are the same and are denoted with the same reference numbers. However, it is to be noted that the strength band now is a metal band which is given the reference number 10 replacing the fiber ribbon shown in FIG. 1. This variant will normally be used when the deployment shall take place in deeper waters. The way in which it is bundled and wound together corresponds to the variant described above. As an example, without thereby being limiting, the metal band 10 in a typical embodiment can have a thickness of 0.8 mm and be wound in two layers.

The power cable, or power umbilical, according to FIG. 3 is another variant of that shown in FIG. 1 and most of the elements are the same and are denoted with the same reference number. However, it is to be noted that the strength band now is a tape only, which is given the reference number 12 and has, actually, only a temporary function. This is to keep the bundle of elongate elements together until the outer sheath 1 of polyethylene is extruded onto the bundle. Further, longitudinally extending grooves 11 are made in or between the outer channel elements 3. This is done to be able to extrude the sheath material 1 into the grooves to lock the outer sheath 1 to the outer channel elements 3 or increase the friction therebetween in order to ensure sufficient torsional stiffness. In addition sheath material is extruded into the grooves that the wire 6 is laying, and partly around the wire 6. To be able to extrude the sheath material into the grooves 11, the tape 12 is wound circumferentially by a predetermined space between each winding such that the sheath material can penetrate into the grooves 11. The way in which the umbilical is bundled and wound together corresponds to the variants described above.

FIG. 4 shows a second main embodiment of the power cable, or power umbilical. Most of the elements from the embodiment according to the FIGS. 1-3 are the same and are denoted with the same reference number with the addition of a mark '. The umbilical according to FIG. 4 is as before basically constructed of the following elements: a bundle of elongate elements consisting of inner and outer channel elements 2', 3', for example of polyvinyl chloride (PVC), electric cables 4' for transfer of vast amounts of electric power/energy, optical conductors 5' and load carrying elements, either in the form of steel wire 6', or in the form of carbon rods 7, or a combination thereof, that are laid together into said bundle. The carbon rods 7 can either be placed individually at several places in the cross section, or gathered in bundles as illustrated by the reference number 8, or a combination thereof, just as shown in FIG. 4. The bundle is kept together and in place by a strength band, in this embodiment according to the variant of FIG. 1 where fiber ribbon 9' is wound circumferentially around the bundle before an outer sheath 1', for example made of polyethylene (PE), is extruded onto the bundle.

It is further to be understood that the power cable, or power umbilical, according to FIG. 4 can have several variants, for example similar to those shown in FIG. 2 having steel band 2 and in FIG. 3 having grooves that the sheath material is extruded into. The steel band increases the torsional stiffness and this variant will normally be used when the deployment will take place in deeper waters. In addition they can include electric wires and/or fluid pipes in the cross section.

FIGS. 5 and 6 show extracts from API (American Petroleum Institute) specification 17E, "Specification for Subsea Production Control Umbilicals", in particular pages 42 and 43. FIG. 5 shows schematically in the lower view an S-Z laid, or oscillatory laid traditional umbilical. The upper figure shows totally schematic how the machinery for this type of laying is contemplated. FIG. 6 shows two variants of traditional umbilicals that can be laid in this way.

The invention claimed is:

1. A power cable, or power umbilical, comprising:

a number of electric cables for transfer of large amounts of electric power/energy;

filler material in the form of stiff elongate plastic elements located at least partially around and between the number of electric cables, the number of electric cables and stiff elongate plastic elements being gathered in a twisted bundle by means of a laying operation;

a protective sheath that encompasses the electric cables and the filler material; and at least one load carrying element at a predetermined location in the cross section of the power cable/umbilical, wherein the number of electric cables, the stiff elongate plastic elements and the at least one load carrying element, are alternately laid, i.e. by continuously alternating direction, in the entire or part of the longitudinal extension of the power cable/umbilical, to form a bundle, and the laid bundle is kept fixed substantially torsion stiff by the protective sheath.

2. The power cable, or power umbilical, according to claim 1, wherein the protective sheath includes a strength band or tape that is helically wound about the bundle in two or more layers, laid in opposite directions.

3. The power cable, or power umbilical, according to claim 1, wherein the protective sheath includes a strength band or tape that is helically wound about the bundle by a relatively short laying of 0.1 to 0.5 meter.

4. The power cable, or power umbilical, according to claim 1, wherein the protective sheath includes a strength band that is made of metallic material.

5. The power cable, or power umbilical, according to claim 1, wherein the protective sheath includes a strength band that comprises fiber armoured ribbon, fiber armoured ribbon with friction liner and textile ribbon, where the fibre armoured ribbon is reinforced with aramid fiber, carbon fiber, glass fiber and other synthetic materials.

6. The power cable, or power umbilical, according to claim 1, wherein the laying of the number of electric cables, the stiff elongate plastic elements and the at least one load carrying element alters direction at irregular intervals.

7. The power cable, or power umbilical, according to claim 1, wherein the laying of the the number of electric cables, the stiff elongate plastic elements and the at least one load carrying element constitutes approximately between one half and three revolutions before the laying changes direction.

8. The power cable, or power umbilical, according to claim 1, wherein the power cable/umbilical includes one or more separate layers with load carrying elements as an outer layer that is located immediately inside the protective sheath, said load carrying elements in each layer being laid in a continuous helix in the same direction in the entire length extension of the power cable/umbilical.

9. The power cable, or power umbilical, according to claim 1, wherein the at least one load carrying element is at least one light weight rod of composite material and/or steel string or steel wire and/or fiber rope and/or polyester rope.

10. The power cable, or power umbilical, according to claim 1, wherein the power cable/umbilical comprises at least one fluid pipe in the cross section, of metal and/or plastic material.

11. A method of manufacturing and laying a number of elongate elements into a power cable, or power umbilical, which includes a number of electric cables for transfer of large amounts of electric power/energy, filler material in the form of stiff elongate plastic elements located at least partially around and between the number of electric cables, the number of electric cables and stiff elongate plastic elements being collectively gathered into a twisted bundle, a protective sheath that encompasses the number of electric wires and the filler material, and at least one load carrying element at a predetermined location in the cross section of the power cable/umbilical in order to take care of axial loads in the power cable/umbilical, said method comprising the steps of:

alternately laying the number of electric cables, the stiff elongate plastic elements and the at least one load carrying element, i.e. by constantly alternatingly direction, in the entire or part of the longitudinal extension of the power cable/umbilical to form a laid bundle; and centrally or peripherally locating the at least one load carrying element during the manufacture; and retaining the laid bundle substantially torsional stiff by applying the outer protective sheath.

12. The method according to claim 11, further comprising the step of laying at least one fluid pipe of metal and/or plastic material into the laid bundle in order to constitute a part of the cross section.

13. The method according to claim 11, wherein the protective sheath includes a strength band or tape that is helically wound about the bundle in two or more layers laid in opposite directions.

14. The method according to claim 11, wherein the protective sheath includes a strength band or tape that is helically wound about the bundle by a relatively short laying of 0.1 to 0.5 meter.

15. The method according to claim 11, further comprising the step of carrying out the laying operation by alternating directions at irregular intervals.

16. The method according to claim 11, wherein the laying operation takes place approximately by one half to three revolutions before the laying alters direction.

17. The method according to claim 11, wherein the power cable/umbilical includes one or more separate layers with load carrying elements that are applied as an outer layer that is located immediately inside the protective sheath, said load carrying elements in each layer being laid in a continuous helix in the same direction in the entire length extension of the power cable/umbilical.

18. The power cable, or power umbilical, according to claim 1, wherein said cable comprises one or more electric wires and or optical conductors.

19. The power cable, or power umbilical, according to claim 1, wherein said cable comprises a strength band, or tape, which is helically wound about the bundle immediately internal of the protective sheath.

20. The power cable, or power umbilical, according to claim 1, wherein the laying of the electric cables, the stiff elongate plastic elements and the at least one load carrying element alters direction at regular intervals.

21. The power cable, or power umbilical, according to claim 1, wherein the power cable/umbilical is without an outside armor layer outward of the number of electric cables and stiff elongate plastic elements.

22. The method according to claim 11, further comprising the step of carrying out the laying operation by alternating directions at regular intervals.

* * * * *